United States Patent [19]

Scag

[11] Patent Number: 4,991,382
[45] Date of Patent: Feb. 12, 1991

[54] LAWN MOWER

[75] Inventor: Dane T. Scag, Elm Grove, Wis.

[73] Assignee: Scag Power Equipment, Inc., Mayville, Wis.

[21] Appl. No.: 400,488

[22] Filed: Aug. 30, 1989

[51] Int. Cl.$^5$ .................................... A01D 34/68
[52] U.S. Cl. ...................... 56/10.9; 56/11.2; 56/11.4; 180/315
[58] Field of Search ............ 56/10.9, 11.1, 11.2, 56/11.3, 11.4, 16.7; 180/6.48, 6.5, 315; 74/491, 534, 535, 475

[56] References Cited

U.S. PATENT DOCUMENTS

| | | | |
|---|---|---|---|
| 2,523,014 | 9/1950 | Gooch | 56/25.4 |
| 2,601,752 | 7/1952 | Rose | 56/26 |
| 2,766,834 | 10/1956 | Boyer | 180/6.48 |
| 3,469,381 | 9/1969 | Burrough et al. | 180/6.3 |
| 3,520,208 | 7/1970 | Davis et al. | 74/534 |
| 3,616,869 | 11/1971 | Rilling | 180/6.48 |
| 3,863,520 | 2/1975 | Moline et al. | 74/534 |
| 3,946,543 | 3/1976 | Templeton | 56/10.9 |
| 4,043,416 | 8/1977 | Albright et al. | 180/6.48 |
| 4,118,999 | 10/1978 | Bieber | 74/475 |
| 4,694,942 | 9/1987 | Ogano et al. | 56/11.3 |
| 4,787,195 | 11/1988 | Wenzel | 56/11.1 |

Primary Examiner—Ramon S. Britts
Assistant Examiner—Terry Lee Melius
Attorney, Agent, or Firm—Michael, Best & Friedrich

[57] ABSTRACT

A lawn mower has a hydraulic motor mounted on each drive wheel and each motor is independently driven by a separate pump. Each pump includes a control lever for regulating fluid pressure and flow direction so that each wheel may be driven independently in the forward and reverse directions and at varying speeds. The control levers are independently connected to two speed control levers mounted on the mower's hand grips. A speed control index is mounted on each hand grip for releasably maintaining the speed control levers in a plurality of forward speed positions so that it is not necessary for the operator to exert hand pressure on the control levers in order to maintain a desired forward speed. A neutral control assembly returns the pump control levers to a neutral position when the control levers are moved into neutral.

33 Claims, 3 Drawing Sheets

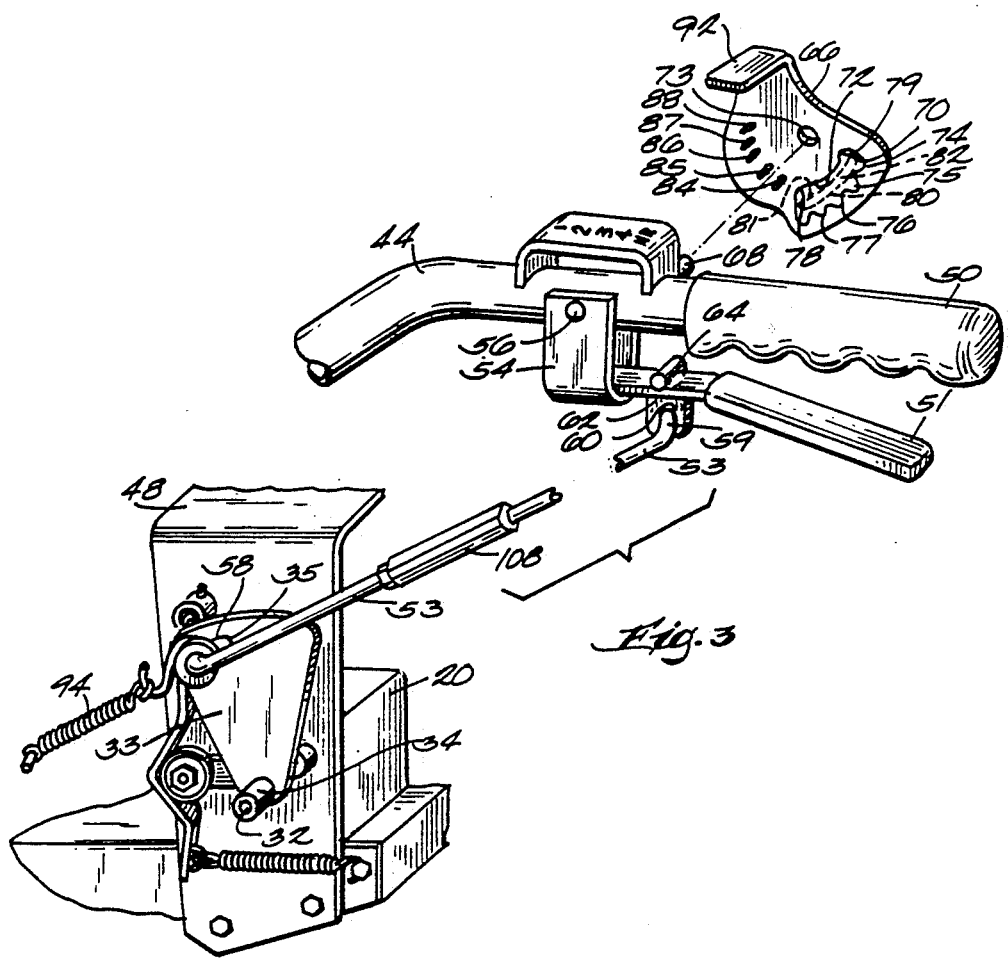
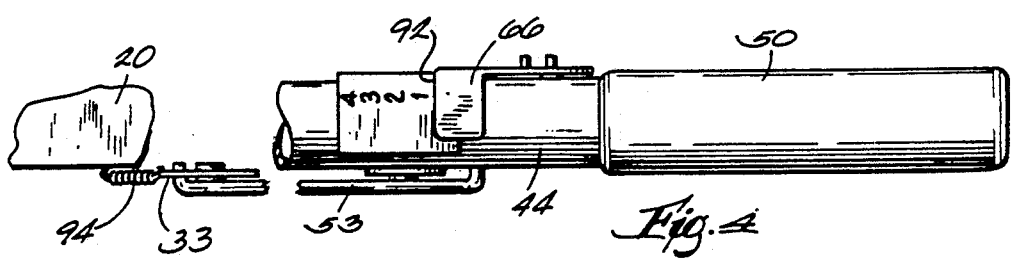
Fig. 4
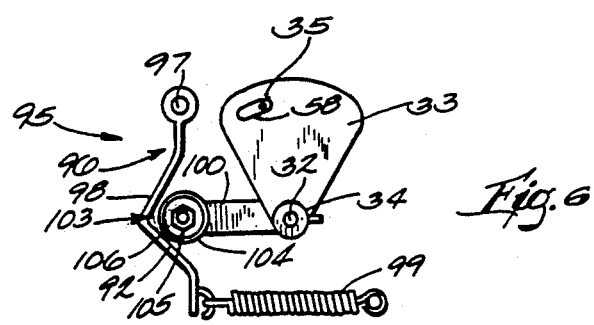
Fig. 6

LAWN MOWER

BACKGROUND OF THE INVENTION

This invention relates to lawn mowers and more particularly to hydraulically driven lawn mowers.

One type of hydraulically driven lawn mower, such as that disclosed in U.S. Pat. No. 3,616,869, includes a pair of drive wheels each of which is independently operated by an individual pump coupled to the mower's engine. Each pump includes a control lever for regulating of fluid pressure to each motor and the direction fluid flow. In this manner, the drive wheels can be independently rotated at selected forward and reverse speeds whereby the mower may be driven either forwardly or in reverse and may be turned through various angles. Hand levers on the mower are manipulated for moving the control levers into the desired positions. A friction type pivot is disclosed in U.S. Pat. No. 3,616,818 for holding the hand levers in selected forward drive positions.

In walking type lawn mowers, the operator must maintain contact with hand grips at the rear of the mower to facilitate manipulation and control. For this reason, it has been suggested that hand operated control levers for each of the drive wheel pumps be mounted for pivotal movement on the mower's hand grips. This has not been wholly satisfactory, however, because the operator is required to exert hand pressure on the levers in order to maintain the desired speed. This causes fatigue, particularly when the mower is used for long periods, such as in the case of commercial operation.

SUMMARY OF THE INVENTION

It is an object to provide a new and improved hydraulically driven lawn mower or similar device.

A further object of the invention is to provide a hydraulically driven lawn mower or similar device wherein various forward speeds can be maintained without hand fatigue.

Another object of the invention is to provide a control for a hydraulically driven lawn mower which is easy and convenient to use.

A still further object of the invention is to provide a hydraulically driven lawn mower having speed control levers on the mower hand grips and which are not easily dislodged.

Yet another object of the invention is to provide a hydraulically driven lawn mower which can be set in a neutral drive state regardless of minor misalignment in the control linkage.

These and other objects and advantages of the present invention will become more apparent from the detailed description thereof taken with the accompanying drawings.

In general terms the invention comprises a lawn mower having a pair of drive wheels, a reversible hydraulic motor coupled to each drive wheel for rotating the same, a pair of simultaneously driven pumps with one of the pumps being connected to each drive wheel, and control means coupled to each pump for controlling the pressure and fluid flow direction between the pump and its associated motor whereby each drive wheel can be driven at various speeds in the forward and reverse directions. Each control includes a control lever coupled to each pump and operable upon being pivoted in a first direction to increase fluid pressure from said pump in a forward direction and being operative upon pivotal movement in the opposite direction to decrease fluid flow to a neutral point where fluid flow ceases and thereafter increasing fluid flow in the reverse direction upon further pivotal movement. Biasing means urges the control lever in the first direction. Indexing means are mounted adjacent each of the control levers and each has a plurality of indexing means mounted adjacent one of the control levers and mounted for displacement to move successive ones of the indexing means into an operative position relative to the control lever and coupling means on the levers is selectively engageable with one of the indexing means. Each of the indexing means is operative to support the control means in a different pivoted position, and link means is provided for coupling each of the control levers to one of the pump means so that the speed of the wheels can be controlled by the pivotal position of its control lever.

According to another of its aspects, the invention comprises a lawn mower having a pair of drive wheels, a reversible hydraulic motor coupled to each drive wheel for rotating the same, a pair of pumps simultaneously driven with one of the pumps being connected to each drive wheel, and control means coupled to each pump for controlling the pressure and fluid flow direction between said pump and its associated motor whereby each drive wheel can be driven at various speeds in the forward and reverse directions. Each control means includes a control element coupled to each pump and operable upon being moved in a first direction to increase fluid pressure from the pump for driving its associated wheel in a forward direction and being operative upon pivotal movement in the opposite direction to decrease fluid flow to a neutral position where fluid flow ceases and thereafter increasing fluid flow in the reverse direction upon further pivotal movement. Each control element has an intermediate neutral position wherein fluid flow is interrupted. Each control means is coupled to the pumps through lost motion means whereby when the control element is in its neutral position incremental movement of the control element in either direction will be inoperative to cause said pumps to move out of its neutral position, and a neutral position resetting means is coupled to the pumps and is operative to retain said pumps in their neutral positions when the control means is in its neutral position.

BRIEF DESCRIPTION OF THE DRAWINGS

FIG. 3 is an exploded perspective view showing one side of the speed control assembly of the lawn mower according to the present invention;

FIG. 4 is a top view of the speed control assembly shown in FIG. 3;

FIG. 6 is an assembly for returning the pump control levers to a neutral position.

DETAILED DESCRIPTION OF THE PREFERRED EMBODIMENT

Figure 1:
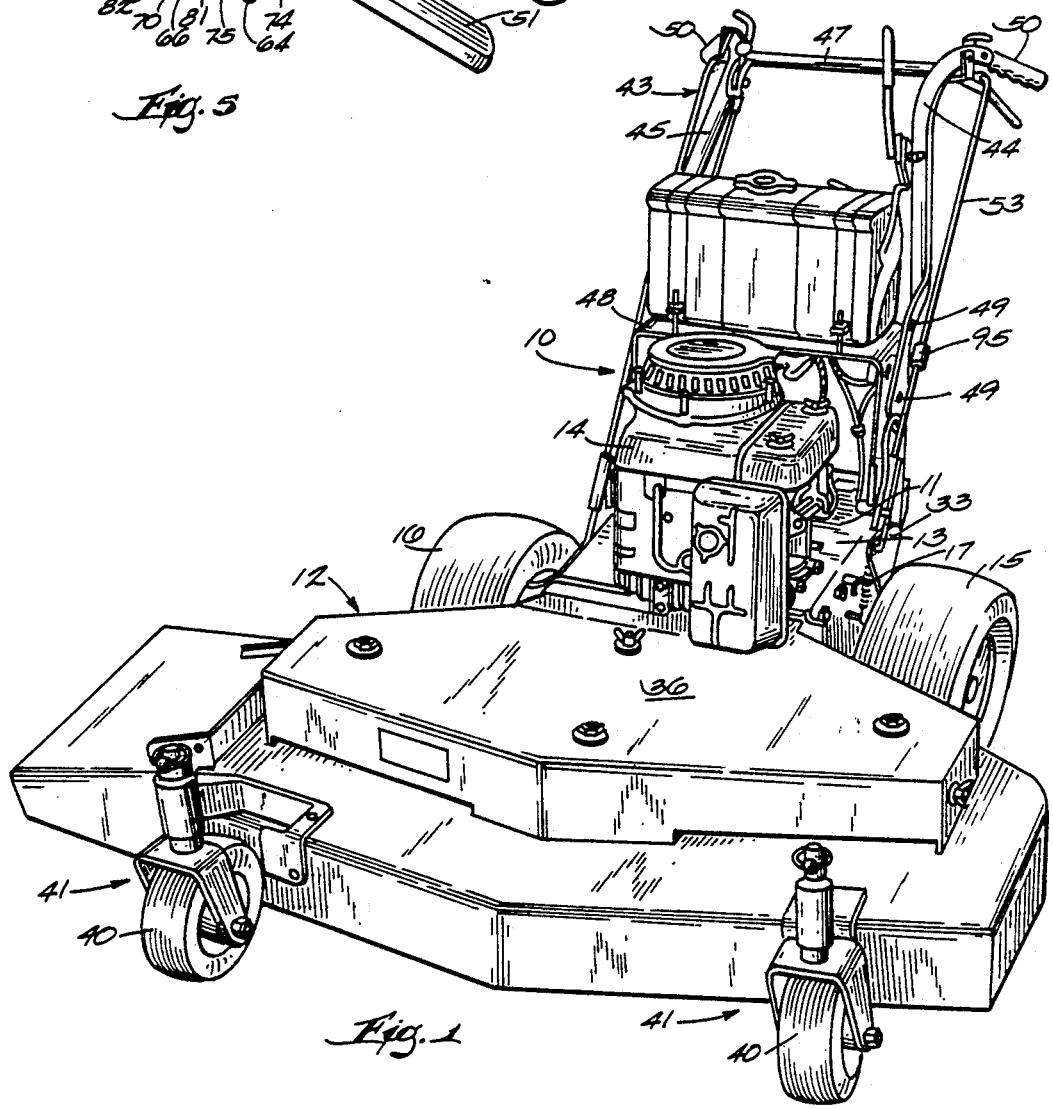
FIG. 1 is a perspective view of a lawn mower incorporating the present invention.
Figure 2:
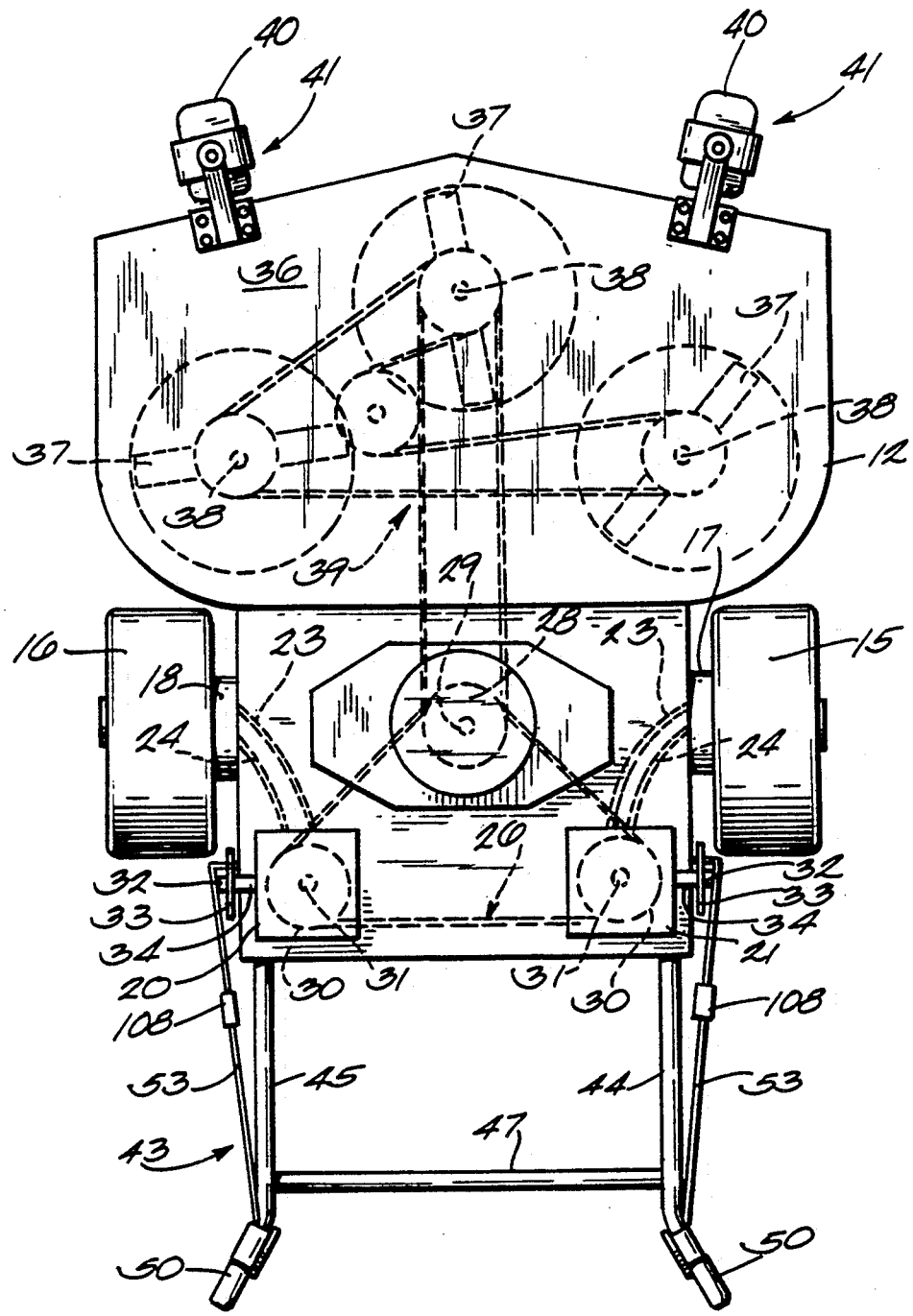
FIG. 2 schematically illustrates a plan view of the lawn mower according to the invention.

The power lawn mower 10, according to the preferred embodiment of the invention as illustrated in FIGS. 1 and 2 includes a drive assembly 11 and a cutter assembly 12. The drive assembly 11 includes an engine deck 13 for supporting a conventional gasoline engine 14. A pair of drive wheels 15 and 16 are mounted on cutter deck 13 and generally on each side of the engine 14. Hydraulic motors 17 and 18 are mounted on wheels 15 and 16, respectively. Pumps 20 and 21 are mounted on engine deck 13 and are respectively connected to motors 17 and 18 through hydraulic conduits 23 and 24. The pumps 20 and 21 are driven at the same speed from the engine 14 by means of a belt 26 which extend around a first pulley 28 mounted on the engine shaft 29 and pulleys 30 mounted on shafts 31 extending downwardly from pumps 20 and 21. Each pump also has a pump control shaft 32, extending therefrom and each has a pump control lever 33 fixed to its outer end. In particular, each lever 33 has an integral bushing at its lower end and which is suitably fixed to shaft 32 extending from each pump 20 and 21. The pump control levers 33 are mirror images and one is shown more particularly in FIG. 3 to be generally triangular with its apex fixed to shaft 34 and having a short slot 35 formed adjacent the forward edge of its base portion.

The cutter assembly 12 includes a cutter deck 36 suitably mounted at the front of the engine deck 13. Mounted below the cutter deck 36 is one or more cutter blades 37 which rotate in a horizontal plane on vertical shafts 38 coupled to the engine 14 by a belt drive assembly 39. The cutter assembly 12, its associated belt drive 39 and the engine 14 are conventional. Accordingly, these parts will not be discussed in detail for the sake of brevity.

A second pair of wheels 40 are mounted at the front of the cutter deck 36 by means of castor assemblies 41 which permit the mower to be turned by the rear wheels 15 and 16 as will be discussed more fully below. A handle assembly 43 is provided for handling and manipulating the mower 10 and consists of a pair of handle members 44 and 45 and a cross member 47 secured adjacent the upper end of handle members 44 and 45 to hold the same in a generally parallel, spaced-apart relation. Each handle member is also fixed by bolts 49 to a U-shaped frame member 48 mounted on the engine deck 13. The handle members 44 and 45 extend upwardly and rearwardly from frame member 48 and each has a downward curve at its remote end for receiving a hand grip member 50.

A speed control lever 51 is pivotally mounted on each handle member 44 and 45 and each is coupled to one of the pump control levers 33 by a control rod 53. The levers 51 are generally bar-like and each is fixed to the lower end of a generally U-shaped bracket 54 the upper ends of which are pivotally mounted by means of a pin 56 received in a suitable opening in the handle member 45 and forwardly of the hand grip 50. Control rod 53 is elongate and its opposite ends 58 and 59 are bent laterally at right angles for being received in slot 35 and an opening 60 formed in an ear 62 fixed to and extending downwardly from the underside of control lever 51 and adjacent bracket 54. A control finger 64 is also mounted on control lever 51 and extends laterally outwardly therefrom at a point generally above ear 62. The control lever 33 shown in FIG. 3 is mounted on pump 20. It will be appreciated that the lever 33 mounted on pump 21 is a mirror image of that mounted on pump 20.

Figure 5:
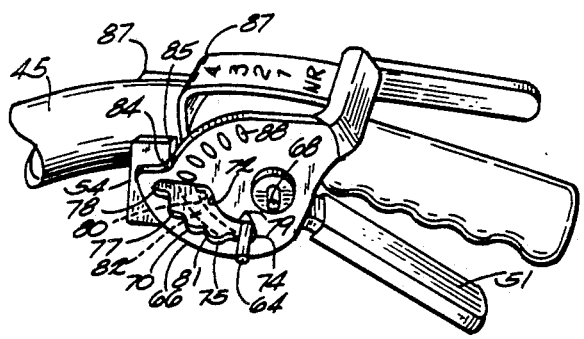
FIG. 5 is a perspective view of the speed control assembly illustrated in FIG. 3 and showing the opposite side thereof.

Mounted adjacent the control lever 51 on each of the handle members 44 and 45 is a speed control index 66. The speed control indexes on each side of the mower are identical except that each is a mirror image of the other. The left hand speed control index is shown in FIGS. 3 and 4 and will now be described. The right hand speed control index is shown in FIG. 5 and corresponding parts have the same reference numerals as the index shown in FIG. 3.

Each speed control index 66 is a relatively flat, pear shaped member pivotally mounted on the inner side of the handle 44 or 45 by means of a pin 68. An indexing slot 70 is formed in index member 66 adjacent its larger end. A first edge 72 of slot 70 is arcuate and all points are equi-distant from the pivot axis 73. The opposite side of slot 70 has an undulating configuration which defines pockets 74, 75, 76, 77 and 78 from one end to the other. The pockets 74–78 are successively located farther from the pivot axis 73 than the preceding pocket whereby pocket 74 is closest to the pivot axis 73 while pocket 78 is the remotest. In addition, there is a pocket 79 opposite pocket 74 and formed at one end of the edge 72 and thereby is closer to the pivot axis 73 than the pockets 74–79. As seen in FIG. 3, pockets 74–79 are respectively indicated by N (neutral) 1, 2, 3, 4 and R (reverse). In other words, the index 66 defines neutral, four forward speeds and reverse. In addition, the broken lines 80 and 81 define an arcuate neutral zone 82 spaced from edge 70 and pockets 75–78 and having its center of curvature at the pivot axis 73 and intersecting the neutral pocket 74.

When the speed control indexes 66 are pivotally mounted on the respective handles 44 or 45, the control finger 64 extends into the sector 70 and its outer circumferential surface is complementary to the contour of the respective pockets 74–79.

Also formed in each speed control index 66 are five slots 84–88 all equi-distant from the pivot axis 73 and spaced apart distances from each other equal to the angular distance between successive pockets 74–78. The slots 84–88 cooperate with a detent 89 disposed on the inner margin of each handle 44 and 45 and spaced from the pivot axis 73 a distance equal to the spacing between said axis and the slots 84–88. The relationship between the slots 84–89, the detent 89, the finger 64 and the slot 70 is such that when slot 84 is engaged by detent 89, finger 64 is in alignment with pocket 74. Similarly, when the detent engages slots 85, 86, 87 and 88, finger 64 will be in alignment with pockets 75, 76, 77 and 78 respectively. In addition, the length of slot 35 on pump control lever 33 is equal to the width of the neutral zone 82 for reasons which will be discussed below. At the end of speed control index 66 opposite the slot 70 there is a thumb lever 92.

Those skilled in the art will appreciate that shafts 34 are coupled at their inner ends to flow control and directional valves (not shown) which are mounted within the housing of each pump. The internal control valves are conventional and need not be described in detail. It is sufficient to understand the invention to state that as the control lever 33 is pivoted counterclockwise as viewed in FIG. 3, fluid pressure to the motor 20 will increase thereby increasing the rotational speed of wheel 15. Conversely, as the lever 33 is pivoted clockwise, fluid flow to pump 20 will decrease until such time as a neutral zone is reached wherein fluid flow to the motor 20 will cease. Further pivotal movement in a clockwise direction will reverse fluid flow in conduits 23 and 24 so that the motor 20 will begin to rotate in the reverse direction and the reversal speed will increase as the lever 33 pivots further.

In operation, when the engine 14 is running, the pumps 20 and 21 will be driven at the same speed. Hydraulic fluid under pressure will be delivered to motors 17 and 18 through conduits 23 and 24. When the direction of fluid flow is to the motor 17 and 18 through conduits 23 and return flow to the pump is through conduit 24, each of the motors will be driven in the forward direction so that the drive wheels 15 and 16 will be correspondingly driven. On the other hand, fluid flow in the opposite direction will cause the motor 17 and 18 to operate in the reverse direction whereby the respective wheels will be driven rearwardly.

A spring 94 is connected between the ends of each pump control rod 53 and the engine deck 13. As seen in FIG. 3, the line of action of spring 94 is generally along the axis of rod 53. When the speed control lever 51 is in one of its four forward speed positions, spring 94 urges the forward end 58 of rod 53 into engagement with the forward end of slot 35 thereby tending to rotate the lever 33 counterclockwise as viewed in FIG. 3. However, when speed control lever 51 is in its neutral position or finger 64 is in pocket 74, the end 58 of rod 53 should be out of engagement with the ends of slot 35. A neutral adjustment assembly 95 as seen in FIG. 6 is provided for returning lever 33 to its neutral position and maintaining said position so that the end 58 of control rod 53 will be positioned intermediate the ends of slot 35 when lever 51 is in its neutral position or finger 64 is in pocket 74.

The assembly 95 includes a bar 96 pivoted at one end on frame member 48 on pivot pin 97 which is adjacent the upper edge of pump control lever 33. Lever 96 extends downwardly from its pivot 97 and has a V-shaped section 98 intermediate its ends. A spring 99 extends between the lower end of bar 96 and the engine deck 13 for urging the bar 96 counterclockwise around its pivot 97. In addition, a short bar 100 is fixed to busing 34 and extends laterally therefrom. An eccentrically mounted roller 103 is rotatably mounted at the free end of bar 100 and its contact surface engages the flat sides of the V-shaped section 98. In particular, roller 103 includes an outer race 104 and an inner race 105 having an eccentrically located opening formed therein. A bolt 106 extends through the opening in race 104 and through an aligned opening (not shown) in the end of bar 100. As those skilled in the art will appreciate, caged balls are located between the races 104 and 105.

The force of spring 94 is larger than spring 99 so that spring 94 must be disconnected when the neutral position of lever 33 is being adjusted. Initially, lever 33 is assembled to shaft 32 such that it will be in approximately the proper position wherein the roller 103 will be at the base of the V-section 98 of bar 96 when shaft 32 is in the neutral position of the internal control valves (not shown) and the end 58 of rod 53 is in slot 35 and spaced from its ends. By releasing the roller 103 and rotating the inner race 105 relative to the end of bar 100, the position of the roller can be adjusted so that it will be at base of section 98 when the shaft 32 in its neutral position. It will be appreciated that the inner race may then be fixed in its adjusted position by means of bolt 106.

It is extremely important that the end 58 of bar 53 be located intermediate the ends of slot 35 when the control finger 64 is in the neutral zone 82 of index 66 and the shaft 32 is in its neutral position. The length of rod 53 may be adjusted by means of turnbuckles 108 which are disposed intermediate the ends of rods 53. After the length of rods 53 have been adjusted, the assembly 95 will be operative to return the lever 33 to its neutral position so that the end 58 of rod 53 is intermediate the ends of slot 35 when the finger 64 is in the neutral zone 82 or in the pocket 74. By coupling the control rod 53 to lever 33 through slot 35 and by insuring that the end of the rod 53 is out of contact with the edges of slot 35 when the lever 33 is in its neutral position, slight misalignment will not cause the lawn mower to begin moving in either the forward or reverse directions when the operator has set the indexing assembly in the neutral position. The operator must intentionally move the finger 64 out of the pocket 74 or the neutral zone 82 in order to commence operation of the forward or reverse direction.

Upon movement of finger 64 out of pocket 74, rotation of the index 66 to a desired position, and release of the handle 51, the rod 53 will be free to be moved into engagement with the front edge of slot 35 by spring 94. When the operator wishes to drive the wheels forwardly, for example, the control lever 51 will be pivoted clockwise as viewed in FIG. 4 and about pin 56 thereby moving finger 64 from pocket 74. The operator may then push on thumb lever 92 to pivot the index 66 through the detents 85-88 until the index is positioned for the proper speed. The operator may then release the control lever 51 and the spring 94 acting through the rod 53 move the finger into the selected pocket.

When the index 66 is being moved, the pin 64 will be held in the neutral zone 82 so that the assembly 95 will return lever 33 to its neutral position whereby wheels 15 and 16 will not be driven during the shifting operation. If the wheels are being driven at any forward speed, the operator can, by pulling back on the lever 51 move the pin 64 back into the neutral zone whereby the assembly 95 will be free to reposition lever 33 in their neutral positions and the wheels will come to rest. If it is desired to drive either of the wheels 15 or 16 in the reverse direction when they are in any of their forward speeds 1-4, the appropriate lever 51 is pivoted counterclockwise to move the finger 64 through the neutral zone and into the reverse zone at the inner edge of slot 70. The wheels will thus slow, come to rest, dwell in the neutral position and then reverse as the end 58 of rod 53 traverses the slot 35 and moves into engagement with the rear edge thereof.

The edge 72 limits reverse speed. It will be appreciated that in order to operate wheel 15 in the reverse direction the operator must maintain pressure on lever 51. If the operator should stumble or walk into an obstacle, so that he releases his grip on lever 50, wheel 15 will begin to rotate in the forward direction and away from the operator. If the operator wishes to drive the wheel 15 in its full reverse speed, this can only be done from the neutral position because pocket 74 lies opposite pocket 79. Here again, however, if the operator releases his grip on lever 51, the wheel 15 will stop.

The speed control at the opposite side of the mower operates identically for driving wheel 16 in forward or reverse directions and at varying speeds. In normal operation, the operator will set the speed control indexes 66 at each side of the mower for the desired forward speed. It is necessary that the wheels 15 and 16 be driven at the same speed for the mower to travel in relatively straight line. If a turn is desired, the wheel at the outside of the turn is driven at a faster speed than that at the inside of the turn or the inside wheel is stopped or driven in the opposite direction. The radius of the turn will be determined by the different relative speeds of the inside and outside wheels. Therefore, in order to affect a turn, the operator will change the relative speeds of the inside and outside wheels by rotating one or both of the levers 51.

The speed control index 66 permits the mower to be driven at any forward speed without the necessity for the operator applying pressure to the control levers 51 and still permits different relative forward speeds of the wheels 15 and 16 so that turns of varying radii can be achieved. Return of the pump control lever to its neutral position when the control lever 51 is moved to neutral is insured by the neutral control mechanism 95.

While only a single embodiment of the invention has been illustrated and described, it is not intended to be limited thereby but only by the scope of the appended claim.

I claim:

1. A lawn mower having a pair of drive wheels, a reversible hydraulic motor coupled to each drive wheel for rotating the same, a pair of simultaneously driven/pumps with one of said pumps being connected to each motor, and control means coupled to each pump for controlling the pressure and fluid flow direction between said pump and its associated motor whereby each drive wheel can be driven at various speeds in the forward and reverse directions, each control means including a control lever coupled to each pump and operable upon being pivoted in a first direction to increase fluid pressure from said pump in a forward direction and being operative upon pivotal movement in the opposite direction to decrease fluid flow to a neutral point where fluid flow ceases and thereafter increasing fluid flow in the reverse direction upon further pivotal movement of said control lever in said opposite direction, biasing means urging said lever in said first direction, index means mounted adjacent each of said control levers and each having a plurality of indexing means, said indexing means each being mounted adjacent one of said control levers and mounted for displacement to move successive ones of said indexing means into an operative position, coupling means on said levers for selectively engaging one of said indexing means, each of said indexing means being operative to support said control lever in a different pivoted position, and link means for coupling each of said control levers to one of said pumps so that the speed of said wheels will be controlled by the pivotal position of said control levers.

2. The lawn mower set forth in claim 1 wherein said indexing means includes a plurality of support surfaces engagable by said coupling means.

3. The lawn mower set forth in claim 1 wherein each said control means includes a second lever mounted on each of said pumps, said link means coupling said control means and second levers of each control means, said second levers being operative to vary the output of said pumps.

4. The lawn mower set forth in claim 2 wherein said indexing means comprises a member pivotally mounted on said mower adjacent said control lever, said support surfaces being formed on said member.

5. The lawn mower set forth in claim 2 and including a pair of hand grip means adjacent the rear of said mower for manipulating the same, each of said control levers and said indexing means are mounted on one of said hand grip means.

6. The lawn mower set forth in claim 5 wherein each said control means includes a second lever mounted on each of said pumps, said link means coupling said control and second levers of each control means, said second levers being operative to vary the output of said pumps.

7. The lawn mower set forth in claim 6 wherein said indexing means comprises a member pivotally mounted on said mower adjacent said control lever, said support surfaces being formed on said member.

8. The lawn mower set forth in claim 7 wherein said indexing means is a relatively flat member having an opening formed therein and having a plurality of member receiving surfaces formed in one side thereof, each of said surfaces lying a different distance from one of said pumps, said coupling means extending into said opening and being shaped complimentary to said surfaces.

9. The lawn mower set forth in claim 8 wherein said control lever and said indexing means are pivotally mounted on each hand grip means about generally parallel axes, pivotal movement of said indexing means being operative to move successive ones of said surfaces into registry with said coupling means to define a plurality of forward speeds and neutral, pivotal movement of said control lever in said opposite direction being operative to move said engaging means out of engagement with said surfaces.

10. The lawn mower set forth in claim 9 and including means for releasably holding said indexing means in each of its speed positions.

11. The lawn mower set forth in claim 10 wherein pivotal movement of one of said control levers to move its engaging means out of engagement with said surfaces being operative to move said coupling means into a neutral zone wherein fluid flow from its associated pump ceases and further movement of said control lever moving said second lever into a reverse drive position.

12. The lawn mower set forth in claim 11 and including means for adjusting the link means whereby the speed of each wheel can be adjusted when said coupling means is in engagement with any of said surfaces.

13. A lawn mower having a pair of drive wheels, a reversible hydraulic motor coupled to each drive wheel for rotating the same, a pair of pumps simultaneously driven with one of said pumps being connected to each motor, and control means coupled to each pump for controlling the pressure and fluid flow direction between said pump and its associated motor whereby each drive wheel can be driven at various speeds in the forward and reverse directions, each control means including a control element coupled to each pump and operable upon being moved in a first direction to increase fluid pressure from said pump for driving its associated wheel in a forward direction and being operative upon pivotal movement in the opposite direction to decrease fluid flow to a neutral point where fluid flow ceases and thereafter increasing fluid flow in the reverse direction upon further movement of said control lever in said opposite direction, biasing means urging said control elements in said first direction, index means mounted adjacent each of said control means and each having a plurality of indexing means, said indexing means each being mounted for displacement to move successive ones of said indexing means into an operative position, each of said control means including engaging means for selectively engaging one of said indexing means, each of said indexing means being operative to support said control means in a different pivoted position, and connecting means for coupling each of said control means to one of said pump means so that the speed of said wheels will be controlled by the position of said control means.

14. A lawn mower having a pair of drive wheels, a reversible hydraulic motor coupled to each drive wheel for rotating the same, a pair of pumps simultaneously driven with one of said pumps being connected to each motor, control means coupled to each pump for controlling the pressure and fluid flow direction between said pump and its associated motor whereby each drive wheel can be driven at various speeds in the forward and reverse directions, each control means including a control element coupled to each pump and being operable upon being moved in a first direction to increase fluid pressure from said pump for driving its associated wheel in a forward direction and being operative upon movement in the opposite direction to decrease fluid flow to a neutral position where fluid flow ceases and thereafter increasing fluid flow in the reverse direction upon further movement of said control element in said opposite direction, each control element having an intermediate neutral position wherein fluid flow is interrupted, each of said control elements being coupled to its respective pump through lost motion means whereby when each said control element is·in its neutral position incremental movement of said control element in either direction will be inoperative to cause its respective pump to move out of its neutral position, lever means mounted on each pump wherein pivotal movement of the lever means in a first direction will increase fluid pressure from said pump for driving its associated wheel in a forward direction and being operative upon pivotal movement in the opposite direction to decrease fluid flow and having an intermediate neutral position, link means coupling said control element to said lever means, said lost motion means including slot means formed in said lever means for being engaged by said link means, and neutral adjustment means coupled to said lever means and being operative to move each of said lever means to their neutral positions when the respective control elements are in their neutral positions, said neutral adjustment means including centering means coupled to said lever means and being operative to center each lever means in its neutral position when its associated control element is in its neutral position.

15. A lawn mower having a pair of drive wheels, a reversible hydraulic motor coupled to each drive wheel for rotating the same, a pair of pumps simultaneously driven with one of said pumps being connected to each motor, first and second control means coupled to said pumps respectively for controlling the pressure and fluid flow direction between each pump and its associated motor whereby each drive wheel can be driven at various speeds in the forward and reverse directions, each control means being movable in a first and an opposite direction and operable upon being moved in the first direction to increase fluid pressure from said pump and for driving its associated wheel in a forward direction and being operative upon movement in the opposite direction to decrease fluid flow to a neutral position where fluid flow ceases and thereafter increasing fluid flow in the reverse direction upon further movement of said control means in said opposite direction, each control means having an intermediate neutral position wherein fluid flow is interrupted, first and second operating means for respectively moving said first and second control means in said forward and opposite directions and having a neutral position, lost motion means for coupling said first and second operating means to said first and second control means, respectively, and neutral adjustment means coupled to said first and second control means and being operative to move said control means into their neutral positions when said operating means are in their neutral positions, said lost motion means permitting significant relative movement of said operating means and said control means so that said neutral adjustment means is free to move said control means to its true neutral position without interference from said operating means.

16. The lawn mower set forth in claim 15 and including biasing means urging said control element in said first direction, index means mounted adjacent each of said control elements and each having a plurality of indexing means, said indexing means being mounted adjacent one of said control elements and mounted for displacement to move successive ones of said indexing means into an operative position, each of said control elements including engaging means for selectively engaging one of said indexing means, each of said indexing means being operative to support said control elements in a different position, connecting means for coupling each of said control means to one of said pump means so that the speed of said wheels will be controlled by the position of said control means.

17. The lawn mower set forth in claim 15 wherein said neutral adjustment means include centering means coupled to said first and second control means being operative to center said control means in their neutral positions when said operating means are in their neutral positions.

18. The lawn mower set forth in claim 17 wherein said first and second control means comprise first and second lever means, respectively, coupled to one of said pumps wherein pivotal movement of said lever means in a first direction increases fluid pressure from its respective pumps for driving the associated wheel in a forward direction and being operative upon pivotal movement in the opposite direction to decrease fluid flow and having an intermediate neutral position.

19. The lawn mower set forth in claim 18 wherein said first and second operating means each includes a link, said lost motion means including a slot means formed in said lever means and being engaged by said link.

20. The lawn mower set forth in claim 17 wherein said centering means includes roller means coupled to said second means and an elongate centering element having a pair of intersecting inclined surfaces formed thereon, and biasing means urging said centering element against said roller means, said second means being in its neutral position when said roller means is at the intersection of said inclined surfaces.

21. A lawn mower having a pair of drive wheels, a reversible hydraulic motor coupled to each drive wheel for rotating the same, a pair of pumps simultaneously driven with one of said pumps being connected to each motor, and first and second control means coupled, respectively, to said pumps for controlling the pressure and fluid flow direction between each said pump and its associated motor whereby each drive wheel can be driven at various speeds in the forward and reverse directions, each control means including a control element coupled to each pump and operable upon being moved in a first direction to increase fluid pressure from said pump for driving its associated wheel in a forward direction and being operative upon movement in the opposite direction to decrease fluid flow to a neutral position where fluid flow ceases and thereafter increasing fluid flow in the reverse direction upon further movement of said control element in said opposite direction, each control element having an intermediate neutral position wherein fluid flow is interrupted, each of said control elements being coupled to said pumps through lost motion means whereby when said control elements are in their neutral positions, incremental movement of said control means in either direction will be inoperative to cause said pumps to move out of their neutral positions, and neutral adjustment means coupled to said pumps and being operative to move said pumps to their neutral positions when the control elements are in their neutral positions, lever means mounted on each pump wherein pivotal movement of the lever means in a first direction will increase fluid pressure from said pump for driving its associated wheel in a forward direction and being operative upon pivotal movement in the opposite direction to decrease fluid flow and having an intermediate neutral position, link means coupling said control elements to their respective lever means, said lost motion means including slot means formed in said lever means and being engaged by said link means.

22. The lawn mower set forth in claim 21 wherein said centering means includes roller means coupled to said second lever and an elongate centering element having pair of intersecting inclined surfaces formed thereon, and biasing means urging said centering element against said roller means, said second lever being in its neutral position when said roller means is at the intersection of said inclined surfaces.

23. The lawn mower set forth in claim 21 and including biasing means urging said control element in said first direction, index means mounted adjacent each of said control element and each having a plurality of indexing means, said indexing means being mounted adjacent one of said control element and mounted for displacement to move successive ones of said indexing means into an operative position, each of said control element including engaging means for selectively engaging one of said indexing means, each of said indexing means being operative to support said control element in a different position, connecting means for coupling each of said control means to one of said pump means so that the speed of said wheels will be controlled by the position of said control means.

24. The lawn mower set forth in claim 33 wherein said indexing means includes a plurality of support surfaces engagable by said coupling means.

25. The lawn mower set forth in claim 24 wherein the control element comprises a second lever, said coupling means being mounted on said second lever.

26. The lawn mower set forth in claim 25 wherein said indexing means comprises a member pivotally mounted on said mower adjacent said second lever, said support surfaces being formed on said member.

27. The lawn mower set forth in claim 25 wherein said lost motion means comprises a slot formed in said second lever, said link means being engagable in said slot.

28. The lawn mower set forth in claim 27 and including a pair of hand grip means adjacent the rear of said mower for manipulating the same, each of said second levers and said indexing means are mounted on one of said hand grip means.

29. The lawn mower set forth in claim 28 wherein said indexing means is a relatively flat member having an opening formed therein and having a plurality of member receiving surfaces formed in one side thereof, each of said surfaces lying a different distance from one of said pumps, said coupling means extending into said opening and being shaped complimentary to said surfaces.

30. The lawn mower set forth in claim 29 wherein there is a second lever and an indexing means are pivotally mounted on each hand grip means about generally parallel axes, pivotal movement of said indexing means being operative to move successive ones of said surfaces into registry with said coupling means to define a plurality of forward speeds and neutral, pivotal movement of said control lever in said opposite direction being operative to move said engaging means out of engagement with said surfaces.

31. The lawn mower set forth in claim 30 and including means for releasably holding said indexing means in each of its speed positions.

32. The lawn mower set forth in claim 31 wherein pivotal movement of one of said second levers to move its engaging mean out of engagement with said surfaces being operative to move said engaging means into a neutral zone wherein fluid flow from its associated pump ceases and further movement of said control lever moving said second lever into a reverse drive position.

33. The lawn mower set forth in claim 32 and including means for adjusting the link means whereby the speed of each wheel can be adjusted when said coupling means is in engagement with any of said surfaces.

* * * * *